(12) United States Patent
Kim et al.

(10) Patent No.: US 11,625,134 B2
(45) Date of Patent: Apr. 11, 2023

(54) TOUCH SENSING UNIT AND DISPLAY DEVICE INCLUDING THE SAME

(71) Applicant: Samsung Display Co., Ltd., Yongin-si (KR)

(72) Inventors: Ji Hoon Kim, Yongin-si (KR); Sang Hun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/397,847

(22) Filed: Aug. 9, 2021

(65) Prior Publication Data

US 2022/0164070 A1    May 26, 2022

(30) Foreign Application Priority Data

Nov. 20, 2020 (KR) .......................... 10-2020-0157077

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/044* (2013.01); *G06F 3/04164* (2019.05); *G06F 2203/04112* (2013.01)

(58) Field of Classification Search
CPC ...... G06F 3/0448; G06F 3/0412; G06F 3/044; G06F 2203/04112; G06F 3/04164; G06F 3/0443; G06F 3/0445; G06F 3/0446; G06F 2203/04103; G06F 2203/04111
See application file for complete search history.

(56) References Cited

U.S. PATENT DOCUMENTS

| 10,824,287 B2 | 11/2020 | Hwang et al. | |
| 2013/0299222 A1* | 11/2013 | Lee | H05K 1/0306 174/250 |
| 2015/0338977 A1* | 11/2015 | Matsumoto | G06F 3/0443 29/850 |
| 2019/0056816 A1* | 2/2019 | Hsu | G06F 3/0446 |
| 2019/0369784 A1* | 12/2019 | Yao | H01L 27/3211 |
| 2020/0019294 A1 | 1/2020 | Lee et al. | |

(Continued)

FOREIGN PATENT DOCUMENTS

| KR | 10-2019-0034942 | 4/2019 |
| KR | 10-2019-0048985 | 5/2019 |

(Continued)

OTHER PUBLICATIONS

"Periodic Table: Indium", Royal Society of Chemistry (https://www.rsc.org/periodic-table/element/49/indium) as it appeared on Aug. 17, 2022. (Year: 2022).*

*Primary Examiner* — Julie Anne Watko
(74) *Attorney, Agent, or Firm* — H.C. Park & Associates, PLC

(57) ABSTRACT

A touch sensing unit includes a base substrate, touch sensing lines disposed on the base substrate, a first touch insulating layer disposed on the touch sensing lines, and touch electrodes disposed on the first touch insulating layer. The touch electrodes overlap the touch sensing lines in a thickness direction. Each of the touch electrodes has a mesh shape including a body and mesh holes. The bodies do not overlap the touch sensing lines in the thickness direction in a remaining area, except for partial areas.

16 Claims, 16 Drawing Sheets

(56) References Cited

U.S. PATENT DOCUMENTS

| | | | |
|---|---|---|---|
| 2020/0026384 A1 | 1/2020 | Rhe et al. | |
| 2021/0020701 A1* | 1/2021 | Zheng | G06F 3/0443 |
| 2021/0326002 A1* | 10/2021 | Chen | G06F 3/0443 |
| 2021/0343797 A1* | 11/2021 | Li | H01L 51/5221 |
| 2022/0019305 A1* | 1/2022 | Ye | G06F 3/0445 |

FOREIGN PATENT DOCUMENTS

| | | |
|---|---|---|
| KR | 10-2020-0008276 | 1/2020 |
| KR | 10-2020-0009634 | 1/2020 |

* cited by examiner

TOUCH SENSING UNIT AND DISPLAY DEVICE INCLUDING THE SAME

CROSS REFERENCE TO RELATED APPLICATION

This application claims priority to and the benefit of Korean Patent Application No. 10-2020-0157077, filed Nov. 20, 2020, which is hereby incorporated by reference for all purposes as if fully set forth herein.

BACKGROUND

Field

One or more embodiments generally relate to a touch sensing unit and a display device including the same.

Discussion

Electronic devices, such as smart phones, digital cameras, notebook computers, navigation systems, smart televisions, and the like, that provide images to users typically include display devices for displaying the images. The display device may include a display panel that generates and displays an image and various input devices.

A touch sensor that recognizes a touch input in a smart phone or a tablet personal computer (PC) has been widely applied to the display device. The touch sensor is a trend to replace (or augment) existing physical input devices, such as a keypad, etc., due to the convenience of a touch method.

A touch sensor may be driven in, for instance, a mutual capacitance method or a self-capacitance method. In the self-capacitance method, a plurality of touch electrodes arranged in rows and columns are driven separately. In addition, the self-capacitance method may include a structure in which a touch electrode and a sensing line (or trace wiring) are disposed together on one layer, and a structure in which the touch electrode and the sensing line are disposed on two layers, respectively. In the self-capacitance method using two layers, since the touch electrode and the sensing line may be disposed to overlap each other in a thickness direction, the touch electrode may be formed in a larger area than in a method using one layer such that touch sensing performance can be improved. In a self-capacitance method using two layers, as a display device increases in size, an overlapping area between a touch electrode and a sensing line increases such that a resistance-capacitance (RC) delay problem may occur.

The above information disclosed in this section is only for understanding the background of the inventive concepts, and, therefore, may contain information that does not form prior art.

SUMMARY

One or more embodiments seek to provide a sensing unit capable of reducing a coupling capacitance between a touch electrode and a sensing line in a self-capacitance method using two layers.

One or more embodiments seek to provide a display device including a sensing unit capable of reducing a coupling capacitance between a touch electrode and a sensing line in a self-capacitance method using two layers.

Additional aspects will be set forth in the detailed description which follows, and, in part, will be apparent from the disclosure, or may be learned by practice of the inventive concepts.

According to one or more embodiments, a touch sensing unit includes a base substrate, touch sensing lines disposed on the base substrate, a first touch insulating layer disposed on the touch sensing lines, and touch electrodes disposed on the first touch insulating layer. The touch electrodes overlap the touch sensing lines in a thickness direction. Each of the touch electrodes has a mesh shape including a body and mesh holes. The bodies do not overlap the touch sensing lines in the thickness direction in a remaining area, except for partial areas.

According to one or more embodiments, a display device includes a display panel and a touch sensing unit. The display panel includes a display area and a non-display area. The display area includes sub-pixels. The touch sensing unit is disposed on the display panel. The touch sensing unit includes touch electrodes disposed in a sensing area and touch sensing lines connected to the touch electrodes. The touch sensing unit includes the touch sensing lines disposed on the display panel, a first touch insulating layer disposed on the touch sensing lines, and the touch electrodes disposed on the first touch insulating layer. The touch electrodes overlap the touch sensing lines in a thickness direction. Each of the touch electrodes has a mesh shape including a body and mesh holes. The bodies do not overlap the touch sensing lines in the thickness direction in a remaining area, except for partial areas.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF SOME EMBODIMENTS

Figure 1:
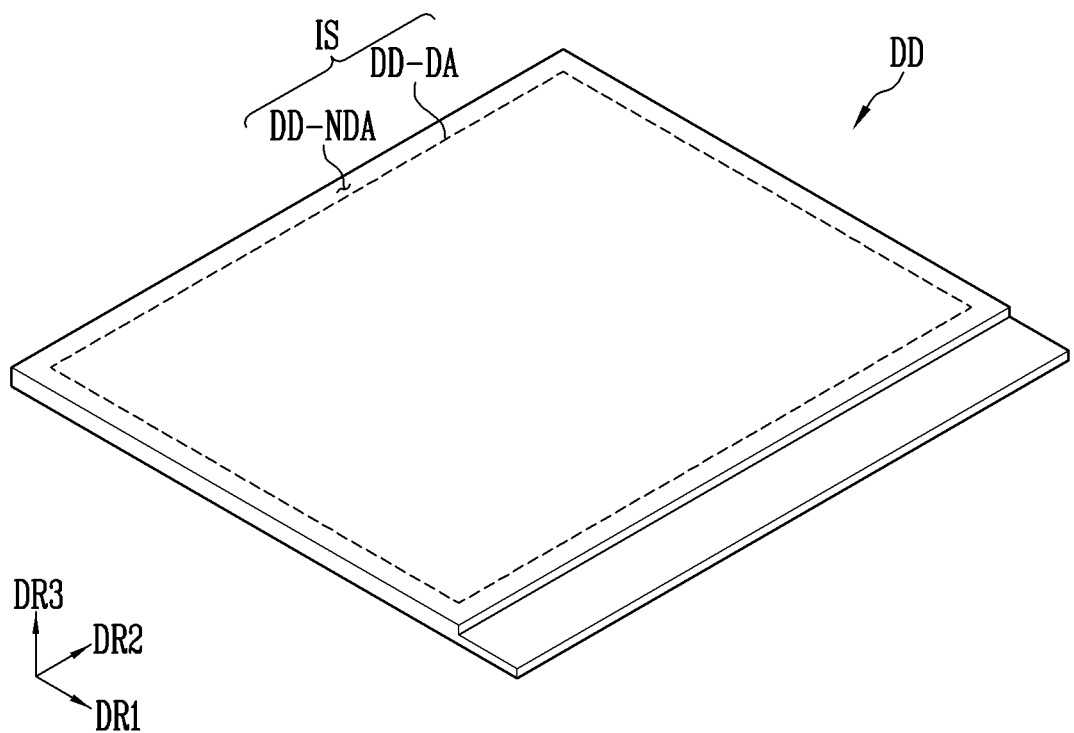
FIG. 1 is a perspective view of a display device according to a first embodiment.

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, an embodiment will be explained in detail with reference to the accompanying drawings.

FIG. 1 is a perspective view of a display device according to a first embodiment.

As shown in FIG. 1, a display surface IS of a display device DD on which an image is displayed may be parallel to a surface defined by a first direction DR1 and a second direction DR2. A normal direction of the display surface IS extends in a third direction DR3, which may be referred to as a thickness direction of the display device DD. The front surface (or upper surface) and rear surface (or lower surface) of each member may be divided by (or spaced apart with respect to) the third direction DR3. It is noted, however, that directions indicated by the first to third directions DR1, DR2, and DR3 may be a relative concept and may be converted to other directions.

The display device DD according to the first embodiment may be a rigid flat panel display device DD; however, the first embodiment is not limited thereto. For instance, the display device DD may be a flexible display device DD. In some implementations, the display device DD may include at least one rigid portion and at least one flexible portion. The display device DD according to the first embodiment may be applied to large electronic devices, such as televisions, monitors, etc., as well as small and medium-sized electronic devices, such as mobile phones, tablets, car navigation systems, game consoles, smart watches, and the like.

The description provided below is with reference to a rigid display device DD having a fixed thickness along the third direction DR3 (also referred to hereinbelow as "thickness direction"), whereby it is understood that for a flexible display device, the thickness of the display device may change due to the display device being folded (such that the display device has an increased thickness in its folded state as compared to its unfolded state), but whereby the thickness direction is still the third direction DR3 as shown in the drawings. As shown in FIG. 1, the display device DD may include a display area DD-DA in which an image is displayed and a non-display area DD-NDA adjacent to the display area DD-DA. The non-display area DD-NDA may be an area in which the image is not displayed. For example, the display area DD-DA may have a rectangular shape and the non-display area DD-NDA may surround the display area DD-DA. However, the first embodiment is not limited thereto. For instance, the display area DD-DA and the non-display area DD-NDA may have various shapes. In some instances, the non-display area DD-NDA may only partially surround the display area DD-DA.

Figure 2:
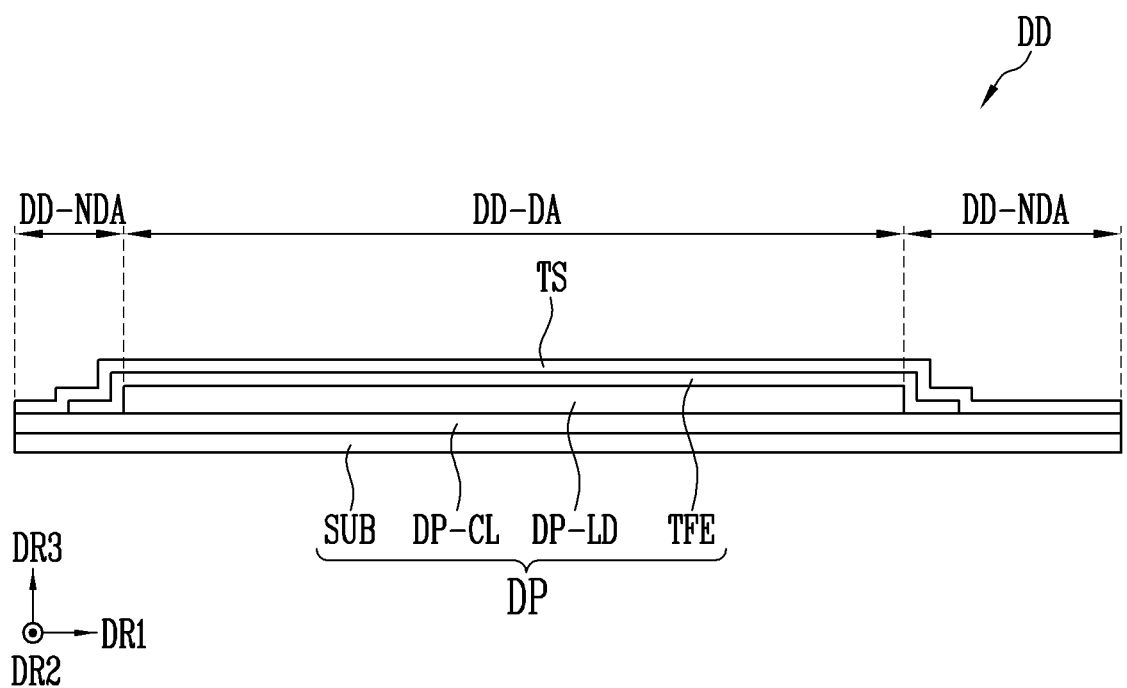
FIG. 2 is a cross-sectional view of the display device of FIG. 1 according to the first embodiment.

FIG. 2 is a cross-sectional view of the display device of FIG. 1 according to the first embodiment. FIG. 2 shows a cross-section defined by the first direction DR1 and the third direction DR3.

As shown in FIG. 2, the display device DD may include a display panel DP and a touch sensing unit TS (or a touch sensing layer). The display device DD according to the first embodiment may include a protective member disposed on a lower surface of the display panel DP, an antireflection member disposed on an upper surface of the touch sensing unit TS, and/or a window member.

The display panel DP may include pixels for displaying an image, and may be a display panel of various types and/or structures. For example, the display panel DP may be a self-light emitting display panel, such as an organic light emitting display (OLED) panel using an organic light emitting diode as a light emitting element, a micro- or nano-scale light emitting diode (LED) display panel using a micro- or nano-scale light emitting diode as a light emitting element, a quantum dot organic light emitting display (QD OLED) panel using an organic light emitting diode and a quantum dot, etc. In some implementations, the display panel DP may be a non-self-light emitting display panel, such as a liquid crystal display (LCD) panel, an electrophoretic display (EPD) panel, an electrowetting display (EWD) panel, etc. When the non-self-light emitting display panel is used as the display panel DP, the display device DD may further include a light source device (for example, a backlight unit) for supplying light to the display panel DP. Hereinafter, the display panel DP will be described as an organic light emitting display panel.

The display panel DP may include a base layer SUB, a circuit element layer DP-CL disposed on the base layer SUB, a display element layer DP-LD, and a thin film encapsulation layer TFE. The display panel DP may further include one or more functional layers, such as an antireflection layer and a refractive index control layer.

The base layer SUB may include at least one plastic film. The base layer SUB may be a flexible substrate and may include at least one of a plastic substrate, a glass substrate, a metal substrate, and an organic/inorganic composite material substrate. The display area DD-DA and the non-display area DD-NDA described with reference to FIG. 1 may be equally defined in (or with respect to) the base layer SUB.

The circuit element layer DP-CL may include at least one intermediate insulating layer and a circuit element. The intermediate insulating layer may include at least one intermediate inorganic layer and at least one intermediate organic layer. The circuit element may include signal lines, a driving circuit of a pixel, and the like. A more detailed description of the circuit element layer DP-CL will be provided later.

The display element layer DP-LD may include light emitting elements. The display element layer DP-LD may further include an organic layer, such as a pixel defining layer.

The thin film encapsulation layer TFE may seal (or encapsulate) the display element layer DP-LD. The thin film encapsulation layer TFE may include at least one inorganic film (hereinafter, referred to as an encapsulation inorganic film). The thin film encapsulation layer TFE may further include at least one organic film (hereinafter, referred to as an encapsulation organic film). The encapsulation inorganic film may protect the display element layer DP-LD from moisture and oxygen, and the encapsulation organic film may protect the display element layer DP-LD from foreign substances, such as dust particles. The encapsulating inorganic film may include at least one of a silicon nitride layer, a silicon oxy nitride layer, a silicon oxide layer, a titanium oxide layer, and an aluminum oxide layer. The encapsulation organic film may include an acrylic organic layer, but the first embodiment is not limited thereto.

The touch sensing unit TS may acquire (or determine) coordinate information of an external input. The touch sensing unit TS may be disposed directly on the organic light emitting display panel DP. For the purposes of this disclosure, the expression that two respective elements are "disposed directly on" one another may mean that the respective elements are formed by a continuous process. In this manner, an adhesive layer is not disposed between the respective elements.

The touch sensing unit TS may have a multilayer structure. The touch sensing unit TS may include a single conductive layer or multiple conductive layers. The touch sensing unit TS may include a single insulating layer or multiple insulating layers. The touch sensing unit TS may detect an external input using, for example, a capacitive method, but the first embodiment is not limited thereto.

Figure 3:
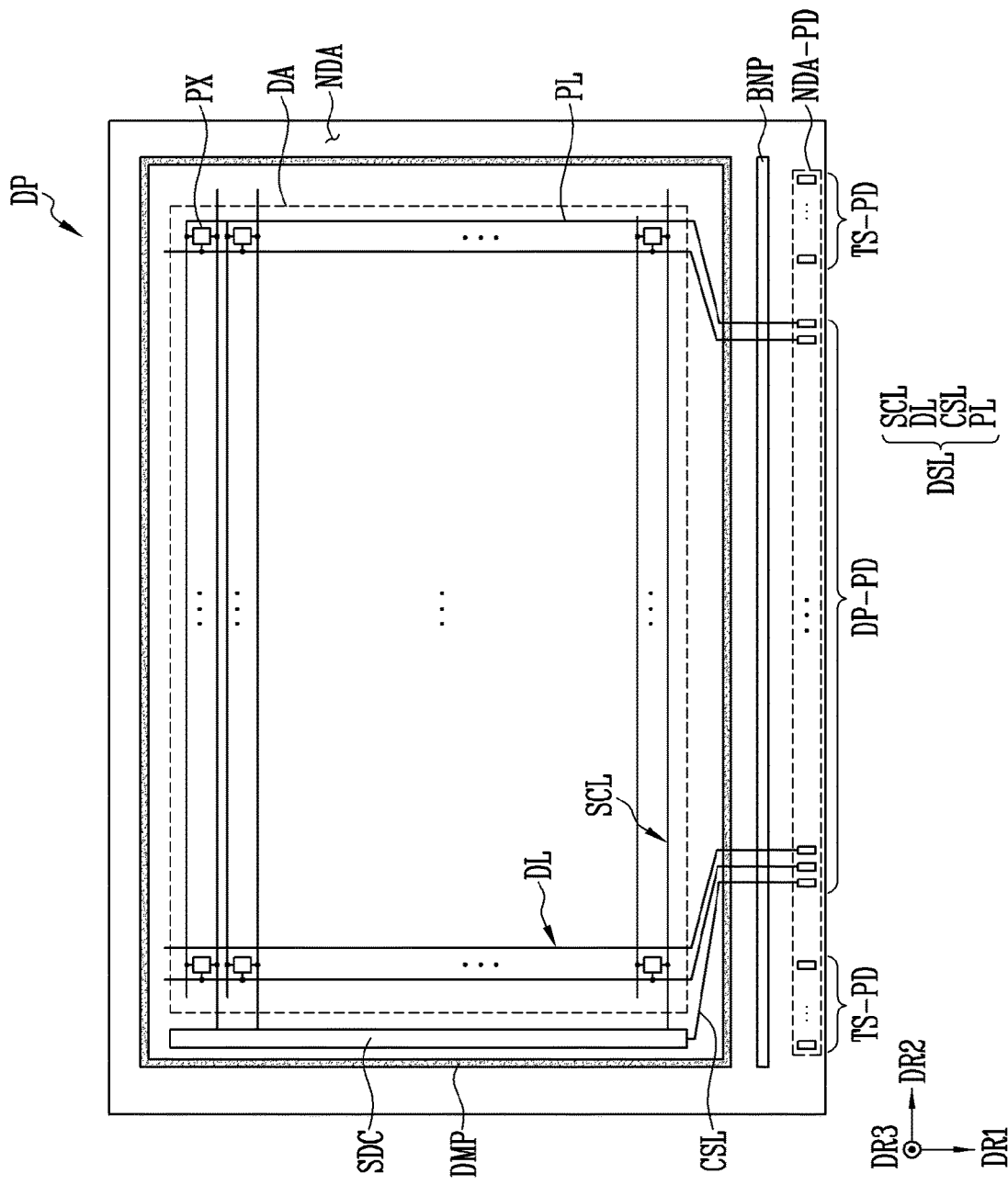
FIG. 3 is a plan view of a display panel according to the first embodiment.

FIG. 3 is a plan view of a display panel according to the first embodiment.

Referring to FIGS. 1, 2, and 3, the display panel DP may include a display area DA and a non-display area NDA on a plane. The non-display area NDA may be defined along at least one edge of the display area DA. The display area DA and the non-display area NDA of the display panel DP may respectively correspond to the display area DD-DA and the non-display area DD-NDA of the display device DD shown in FIG. 1. The display area DA and the non-display area NDA of the display panel DP need not necessarily correspond to the display area DD-DA and the non-display area DD-NDA of the display device DD. As such, the display area DA and the non-display area NDA may be changed according to the structure and design of the display panel DP.

According to the first embodiment, the display panel DP may include a driving circuit for driving pixels PX and display signal lines DSL. For example, the driving circuit for driving the pixels PX may include a scan driver SDC, and the display signal lines DSL for driving the pixels PX may include scan lines SCL, data lines DL, a power source line PL, and scan control lines CSL.

The plurality of pixels PX may be disposed in the display area DA. Each of the pixels PX may include a light emitting element and a pixel driving circuit connected thereto. The scan driver SDC, the display signal lines DSL, and the pixel driving circuit may be included in the circuit element layer DP-CL shown in FIG. 2.

The scan driver SDC may generate a plurality of scan signals and sequentially output the plurality of scan signals to the plurality of scan lines SCL, which will be described later. The scan driver SDC may further output another control signal to the driving circuit of the pixels PX.

The scan driver SDC may include a plurality of thin film transistors, which may be formed through the same process(es) as the driving circuit of the pixels PX, for example, a low temperature polycrystaline silicon (LTPS) process or a low temperature polycrystalline oxide (LTPO) process.

The scan lines SCL may be respectively connected to a corresponding pixel PX (or row of pixels PX) among the plurality of pixels PX, and the data lines DL may be respectively connected to a corresponding pixel PX (or column of pixels PX) among the plurality of pixels PX. The power source line PL may be connected to the plurality of pixels PX. The scan control lines CSL may provide control signals to the scan driver SDC. For example, the scan control lines CSL may include a scan start signal line, first and second clock signal lines, and/or the like.

The display panel DP may include signal pads DP-PD connected to ends of the display signal lines DSL. The display signal pads DP-PD may be a kind of circuit element. An area in which the display signal pads DP-PD are disposed in the non-display area NDA may be defined as a pad area NDA-PD.

Touch signal pads TS-PD connected to touch signal lines to be described later may also be disposed in the pad area NDA-PD. According to the first embodiment, the touch signal lines may be electrically connected to a touch driving IC TIC (refer to FIG. 8) through the touch signal pads TS-PD.

The display panel DP may include a dam part DMP. The dam part DMP may extend along at least one edge of the display area DA. The dam part DMP may surround the display area DA. A portion of the dam part DMP may be parallel to the pad area NDA-PD.

The display panel DP may include a bank BNP. The bank BNP may be disposed between the display area DA and the pad area NDA-PD. The bank BNP may be parallel to a portion of the dam part DMP and the pad area NDA-PD. In the first embodiment, at least one of the dam part DMP and the bank BNP may be omitted.

Figure 4:
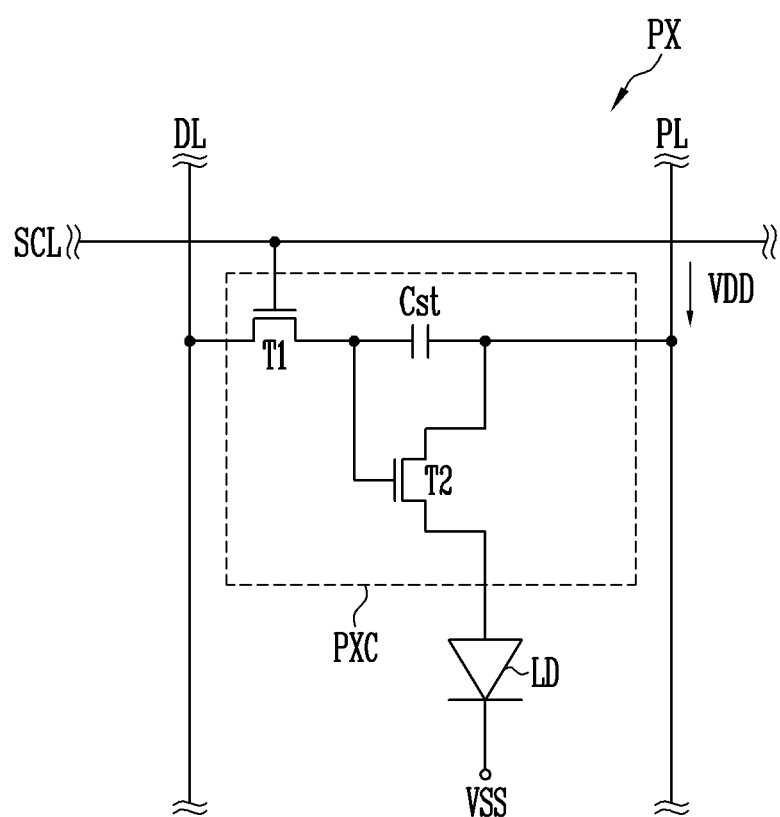
FIG. 4 is an equivalent circuit diagram of a pixel of a display device according to the first embodiment.

FIG. 4 is an equivalent circuit diagram of a pixel according to the first embodiment.

FIG. 4 shows a pixel PX connected to any one scan line SCL, any one data line DL, and a power source line PL as an example. The configuration of the pixel PX is not limited thereto and may be modified.

The pixel PX may include a light emitting element LD and a pixel driving circuit PXC for driving the light emitting element LD. The light emitting element LD may be a top emission type diode and/or a bottom emission type diode. The pixel driving circuit PXC may include a first transistor T1 (e.g., a switching transistor), a second transistor T2 (e.g., a driving transistor), and a capacitor Cst. A first power source voltage VDD may be provided to the second transistor T2, and a second power source voltage VSS may be provided to the light emitting element LD. The second power source voltage VSS may be a voltage lower than the first power source voltage VDD.

The first transistor T1 may output a data signal applied to the data line DL in response to a scan signal applied to the scan line SCL. The capacitor Cst may charge a voltage corresponding to the data signal received from the first transistor T1.

The second transistor T2 may be connected to the light emitting element LD. The second transistor T2 may control a driving current flowing through the light emitting element LD in response to the amount of charge stored in the capacitor Cst. The light emitting element LD may emit light during a turned-on period of the second transistor T2.

Figure 5:
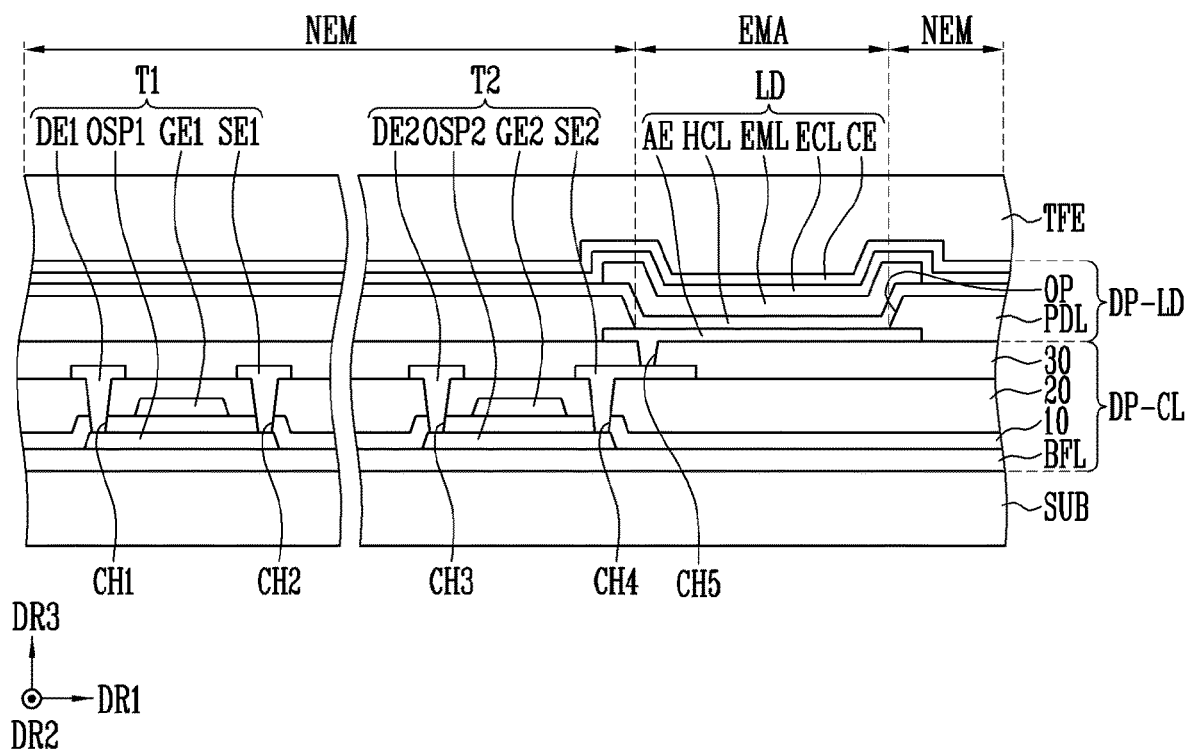
FIG. 5 is an enlarged cross-sectional view of the display panel of FIG. 3 according to the first embodiment.

FIG. 5 is an enlarged cross-sectional view of the display panel according to the first embodiment.

FIG. 5 is a partial cross-sectional view of the display panel DP corresponding to the equivalent circuit diagram shown in FIG. 4. The circuit element layer DP-CL, the display element layer DP-LD, and the thin film encapsulation layer TFE may be sequentially disposed on the base layer SUB.

The circuit element layer DP-CL may include at least one inorganic layer, at least one organic layer, and the circuit element. The circuit element layer DP-CL may include a buffer layer BFL as an inorganic layer, a first intermediate inorganic layer 10, a second intermediate inorganic layer 20, and an intermediate organic layer 30 as an organic layer.

The inorganic layers may include at least one of silicon nitride, silicon oxy nitride, silicon oxide, and the like. The organic layer may include at least one of acrylic resin, methacrylic resin, polyisoprene, vinyl resin, epoxy resin, urethane resin, cellulose resin, siloxane resin, polyimide resin, polyamide resin, perylene resin, and the like. The circuit element may include conductive patterns and/or semiconductor patterns.

The buffer layer BFL may improve bonding strength between the base layer SUB and the conductive patterns or semiconductor patterns. A barrier layer for preventing foreign substances from entering may be further disposed on the upper surface of the base layer SUB. The buffer layer BFL and the barrier layer may be selectively disposed/omitted.

A semiconductor pattern OSP1 (hereinafter, referred to as a first semiconductor pattern) of the first transistor T1 and a semiconductor pattern OSP2 (hereinafter, referred to as a second semiconductor pattern) of the second transistor T2 may be disposed on the buffer layer BFL. The first semiconductor pattern OSP1 and the second semiconductor pattern OSP2 may be selected from, for instance, amorphous silicon, polysilicon, and metal oxide semiconductor.

The first intermediate inorganic layer 10 may be disposed on the first semiconductor pattern OSP1 and the second semiconductor pattern OSP2. A control electrode GE1 (hereinafter, referred to as a first control electrode) of the first transistor T1 and a control electrode GE2 (hereinafter, referred to as a second control electrode) of the second transistor T2 may be disposed on the first intermediate inorganic layer 10. The first control electrode GE1 and the second control electrode GE2 may be manufactured according to the same photolithography process as the scan lines SCL (refer to FIG. 5A).

The second intermediate inorganic layer 20 covering the first control electrode GE1 and the second control electrode GE2 may be disposed on the first intermediate inorganic layer 10. An input electrode DE1 (hereinafter, referred to as a first input electrode) and an output electrode SE1 (hereinafter, referred to as a first output electrode) of the first transistor T1 and an input electrode DE2 (hereinafter, referred to as a second input electrode) and an output electrode SE2 (hereinafter, referred to as a second output electrode) of the second transistor T2 may be disposed on the second intermediate inorganic layer 20.

The first input electrode DE1 and the first output electrode SE1 may be connected to the first semiconductor pattern OSP1 through a first contact hole CH1 and a second contact hole CH2 penetrating the first intermediate inorganic layer 10 and the second intermediate inorganic layer 20. The second input electrode DE2 and the second output electrode SE2 may be connected to the second semiconductor pattern OSP2 through a third contact hole CH3 and a fourth contact hole CH4 penetrating the first intermediate inorganic layer 10 and the second intermediate inorganic layer 20. In another implementation, some of the first transistor T1 and the second transistor T2 may be configured as a bottom gate structure or a dual gate structure.

An intermediate organic layer 30 covering the first input electrode DE1, the second input electrode DE2, the first output electrode SE1, and the second output electrode SE2 may be disposed on the second intermediate inorganic layer 20. The intermediate organic layer 30 may provide a flat surface.

The display element layer DP-LD may be disposed on the intermediate organic layer 30. The display element layer DP-LD may include a pixel defining layer PDL and the light emitting element LD. The pixel defining layer PDL may include an organic material like the intermediate organic layer 30. A first electrode AE may be disposed on the intermediate organic layer 30. The first electrode AE may be connected to the second output electrode SE2 through a fifth contact hole CH5 penetrating the intermediate organic layer 30. An opening OP may be defined in the pixel defining layer PDL. The opening OP of the pixel defining layer PDL may expose at least a partial area of the first electrode AE.

The pixel PX may be disposed in a pixel area on a plane. The pixel area may include an emission area EMA and a non-emission area NEM adjacent to the emission area EMA. The non-emission area NEM may surround the emission area EMA. In the first embodiment, the emission area EMA may be defined to correspond to the partial area of the first electrode AE exposed by the opening OP.

A hole control layer HCL may be commonly disposed in the emission area EMA and the non-emission area NEM. A common layer, such as the hole control layer HCL, may be commonly formed in the plurality of pixels PX (refer to FIG. 3).

A light emitting layer EML may be disposed on the hole control layer HCL. The light emitting layer EML may be disposed in an area corresponding to the opening OP. For instance, the light emitting layer EML may be formed to be separated from each other in the plurality of pixels PX, but the first embodiment is not limited thereto. The light emitting layer EML may include an organic material and/or an inorganic material. The patterned light emitting layer EML is shown as an example, but the light emitting layer EML may be commonly disposed in the plurality of pixels PX. In this case, the light emitting layer EML may generate white light. In addition, the light emitting layer EML may have a multilayer structure.

An electron control layer ECL may be disposed on the light emitting layer EML. The electron control layer ECL may be commonly formed in the plurality of pixels PX (refer to FIG. 3).

A second electrode CE may be disposed on the electron control layer ECL. The second electrode CE may be commonly disposed in the plurality of pixels PX.

The thin film encapsulation layer TFE may be disposed on the second electrode CE. The thin film encapsulation layer TFE may be commonly disposed on the plurality of pixels PX. In the first embodiment, the thin film encapsulation layer TFE may directly cover the second electrode CE. In some implementations, a capping layer covering the second electrode CE may be further disposed between the thin film encapsulation layer TFE and the second electrode CE. In this case, the thin film encapsulation layer TFE may directly cover the capping layer.

Figure 6:
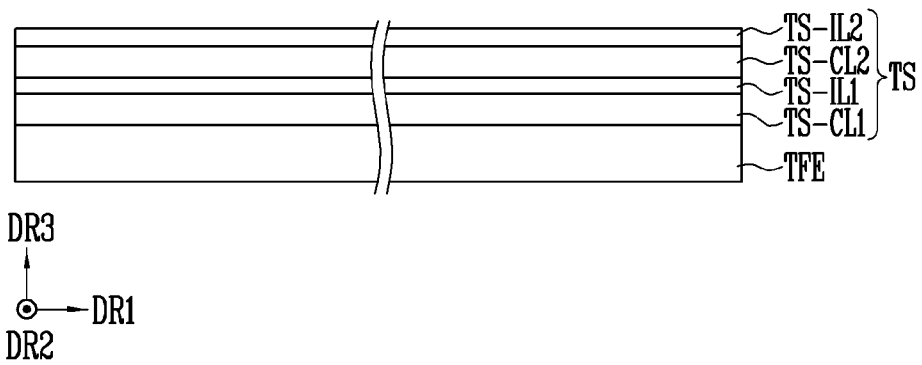
FIG. 6 is a schematic cross-sectional view a touch sensing unit according to a first embodiment.
Figure 7:
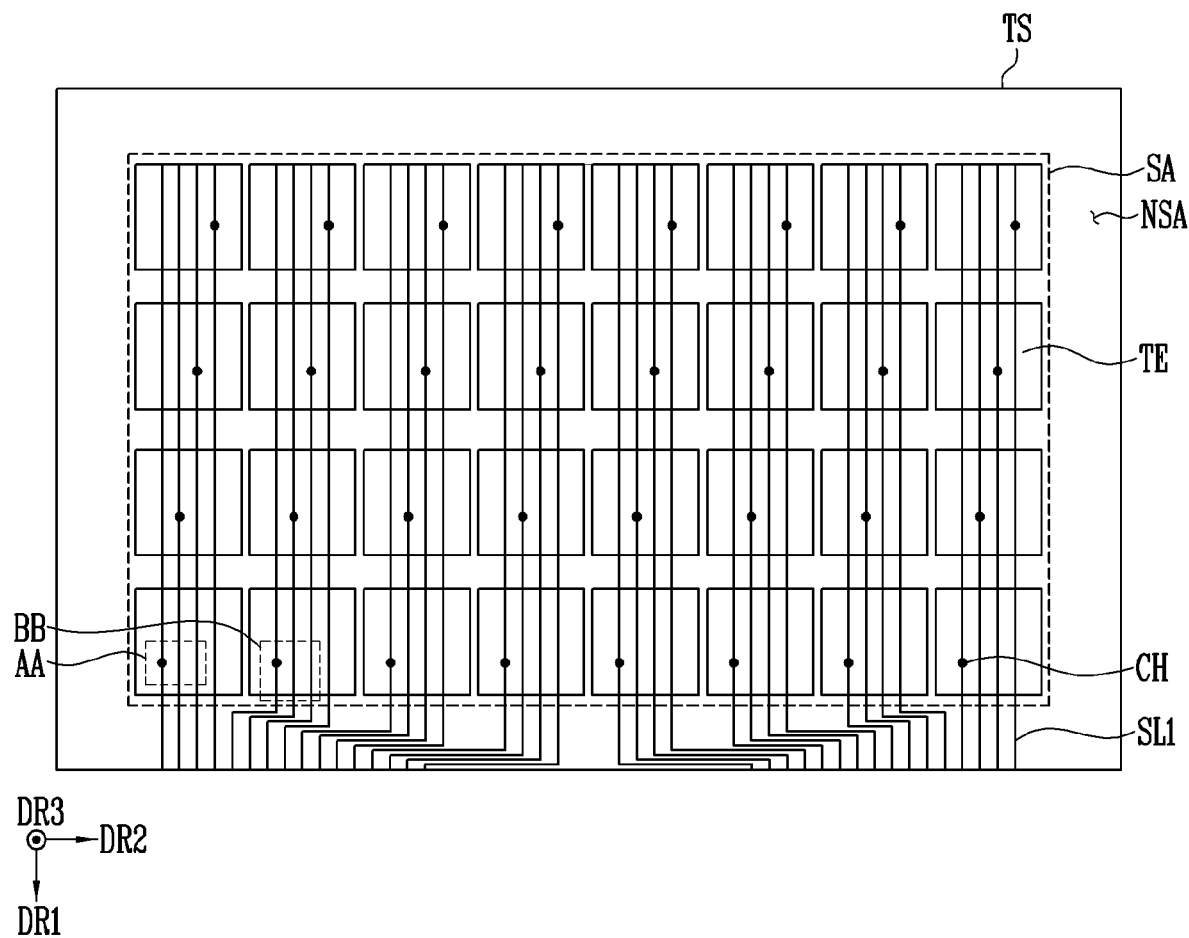
FIG. 7 is a schematic plan view of a touch sensing unit according to the first embodiment.

FIG. 6 is a schematic cross-sectional view of a touch sensing unit according to the first embodiment. FIG. 7 is a schematic plan view of the touch sensing unit according to the first embodiment.

Referring to FIGS. 6 and 7, the touch sensing unit TS according to the first embodiment may include a first conductive layer TS-CL1, a first insulating layer TS-IL1 (hereinafter, referred to as a first touch insulating layer), a second conductive layer TS-CL2, and a second insulating layer TS-IL2 (hereinafter, referred to as a second touch insulating layer). The touch sensing unit TS may acquire coordinate information through a self-capacitance method.

The first conductive layer TS-CL1 may be disposed directly on the thin film encapsulation layer TFE (or the base substrate); however, the first embodiment is not limited thereto. For instance, another inorganic or organic layer may be further disposed between the first conductive layer TS-CL1 and the thin film encapsulation layer TFE. The first conductive layer TS-CL1 may include touch sensing lines SL and connection electrodes BRL (refer to FIG. 9). The first touch insulating layer TS-IL1 may be disposed on the first conductive layer TS-CL1, and the second conductive layer TS-CL2 may be disposed on the first touch insulating layer TS-IL1. For example, the second conductive layer TS-CL2 may include touch electrodes TE. In the first embodiment, the touch electrodes TE and the touch sensing lines SL or the touch electrodes TE and the connection electrodes BRL may be electrically and physically connected through contact holes CH. The second touch insulating layer TS-IL2 may be disposed on the second conductive layer TS-CL2. The first and second touch insulating layers TS-IL1 and TS-IL2 may include an inorganic layer. The first and second touch insulating layers TS-IL1 and TS-IL2 may further include an organic layer.

As shown in FIG. 7, the touch sensing unit TS may include a sensing area SA capable of sensing a touch input (or interaction) and a non-sensing area NSA surrounding at least a portion of the sensing area SA. According to the first embodiment, the sensing area SA may be disposed to correspond to the display area DA of the display panel DP, and the non-sensing area NSA may be disposed to correspond to the non-display area NDA of the display panel DP. For example, the sensing area SA of the touch sensing unit TS may overlap the display area DA of the display panel DP in the third direction DR3, and the non-sensing area NSA of the touch sensing unit TS may overlap the non-display area NDA of the display panel DP in the third direction DR3.

The touch sensing unit TS may include the touch electrodes TE disposed to be spaced apart from each other and the touch sensing lines SL1 disposed on a different layer than the touch electrodes TE. Each of the touch electrodes TE and the touch sensing lines SL1 may have a mesh shape defined by mesh holes and a body.

According to the first embodiment, the touch electrodes TE may be arranged in a matrix form. The touch electrodes TE may have a rectangular shape, but the first embodiment is not limited thereto. In some implementations, the touch electrodes TE may have various shapes, such as a polygonal shape, an oval shape, a circular shape, etc. Also, in some implementations, the touch electrodes TE may have two or more shapes. For example, some of the touch electrodes TE may have a rectangular shape, and the rest of the touch electrodes TE may have a circular shape.

The touch electrodes TE may be disposed in the form of islands spaced apart from each other along the first direction DR1 and the second direction DR2. The touch electrodes TE may form an electrode row in the second direction DR2 and may form an electrode column in the first direction DR1.

In FIG. 7, for convenience of description and illustration, the touch electrodes TE are shown in a 4×8 matrix form. For instance, four touch electrodes TE are disposed along the first direction DR1 and eight touch electrodes TE are disposed along the second direction DR2. However, this is an example, and the number and arrangement structure of the touch electrodes TE may be variously changed according to the size and configuration of the display device DD.

The number of touch sensing lines SL1 included in one electrode column may correspond to the number of touch electrodes TE included in one electrode column. For example, as shown in FIG. 7, when four touch electrodes TE are included in one electrode column, the number of touch sensing lines SL1 may be four.

The touch sensing lines SL1 according to the first embodiment may extend in the first direction DR1 and may be arranged along (e.g., spaced apart from one another in) the second direction DR2. One end of the touch sensing lines SL may be connected to the touch electrodes TE through the contact holes CH, and another end may be electrically connected to the touch signal pads TS-PD shown in FIG. 3.

The plurality of touch sensing lines SL1 may have substantially the same length extending in the first direction DR1 in the sensing area SA. Also, the number of touch sensing lines SL1 overlapping each of the touch electrodes TE in the thickness direction (e.g., the third direction DR3) may be the same. In addition, in an area where the touch electrodes TE overlap the touch sensing lines SL1 in the thickness direction (e.g., the third direction DR3), all of the plurality of touch sensing lines SL may have the same length extending in the first direction DR1. For at least this reason, the sizes (or extent) of RC loads formed between the touch electrodes TE and the touch sensing lines SL1 may be substantially the same.

Figure 8:
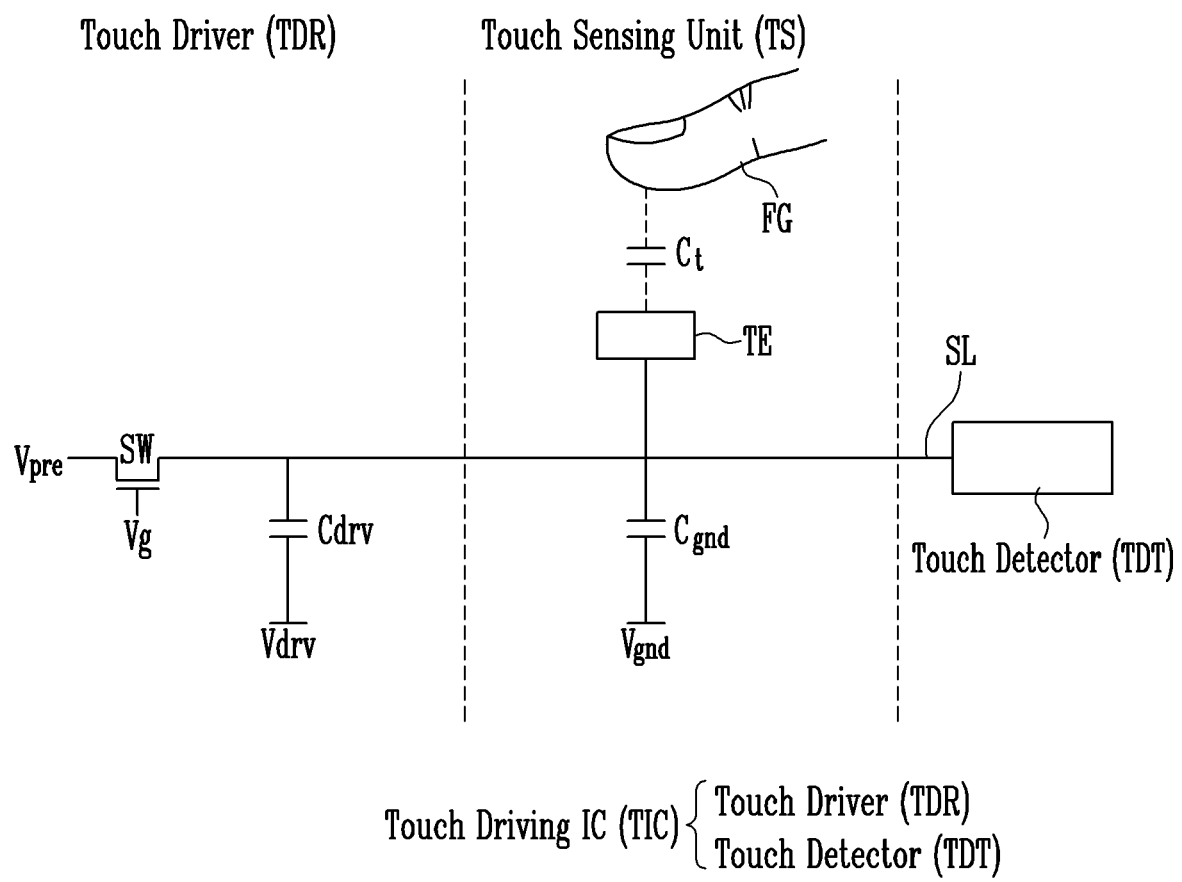
FIG. 8 is a diagram schematically illustrating a circuit for detecting a touch according to the first embodiment.

FIG. 8 is a diagram schematically illustrating a circuit for detecting a touch according to the first embodiment.

Referring to FIG. 8, the touch driving IC TIC may include a touch driver TDR and a touch detector TDT. The touch driver TDR may supply a driving signal to the touch sensing unit TS (or touch electrode TE), and may receive a sensing signal corresponding to the driving signal from the touch sensing unit TS (or touch electrode TE) to detect a touch position.

For example, a precharging switching element SW of the touch driver TDR may be controlled by a gate voltage Vg and apply a precharge voltage Vpre to the touch electrode TE. The touch sensing unit TS may include a driving voltage generator provided in the touch driver TDR to enhance touch sensitivity. When detecting a touch, the driving voltage generator may apply a touch driving voltage Vdrv to a driving capacitor Cdrv.

When, for instance, a finger FG touches (or otherwise interacts with) the touch sensing unit TS (or touch electrode TE), a contact capacitive capacitance Ct may be generated. It is noted that a cover window may be disposed on the touch electrode TE. When the cover window overlapping the touch electrode TE in the thickness direction (e.g., the third direction DR3) is touched with the finger FG, it can be considered that the contact capacitive capacitance Ct is generated.

According to a voltage value applied to a common driving electrode, a value of a capacitive capacitance formed between the touch electrode TE and the common driving electrode may be changed. The touch electrodes TE may overlap at least one electrode provided in the display panel DP. For example, when the display panel DP is an organic light emitting diode display panel, the touch electrodes TE may overlap a cathode electrode CE (refer to FIG. 5) of the display panel DP. According to the first embodiment, the cathode electrode CE of the display panel DP may function as the common driving electrode.

The value Cgnd of the capacitive capacitance formed between the touch electrode TE and the common driving electrode may be changed according to a touch ground voltage Vgnd applied to the common driving electrode In a state in which the touch driving voltage Vdrv is applied to the driving capacitor Cdrv, the touch detector TDT may determine whether or not a touch input means (for example, the finger FG) is in contact with the touch electrode TE based on a voltage difference between when the contact capacitive capacitance Ct being generated and when the contact capacitive capacitance Ct is not generated.

For example, when a user's finger FG contacts at least one of the touch electrodes TE, the contact capacitive capacitance Ct may be generated between the finger FG and the touch electrodes TE, and the value Cgnd of the capacitive capacitance may be changed by the contact capacitive capacitance Ct. The value Cgnd of the changed capacitive capacitance may be transmitted to the touch detector TDT through the touch sensing lines SL connected to the touch electrodes TE to which the finger FG contacts. The touch detector TDT may detect the touch position by checking touch sensing lines SL1 and SL2 in which the value of the changed capacitive capacitance Cgnd is received. For instance, the touch detector TDT may detect the touch position by detecting a change amount of self-capacitance formed in the touch electrode TE.

Figure 9:
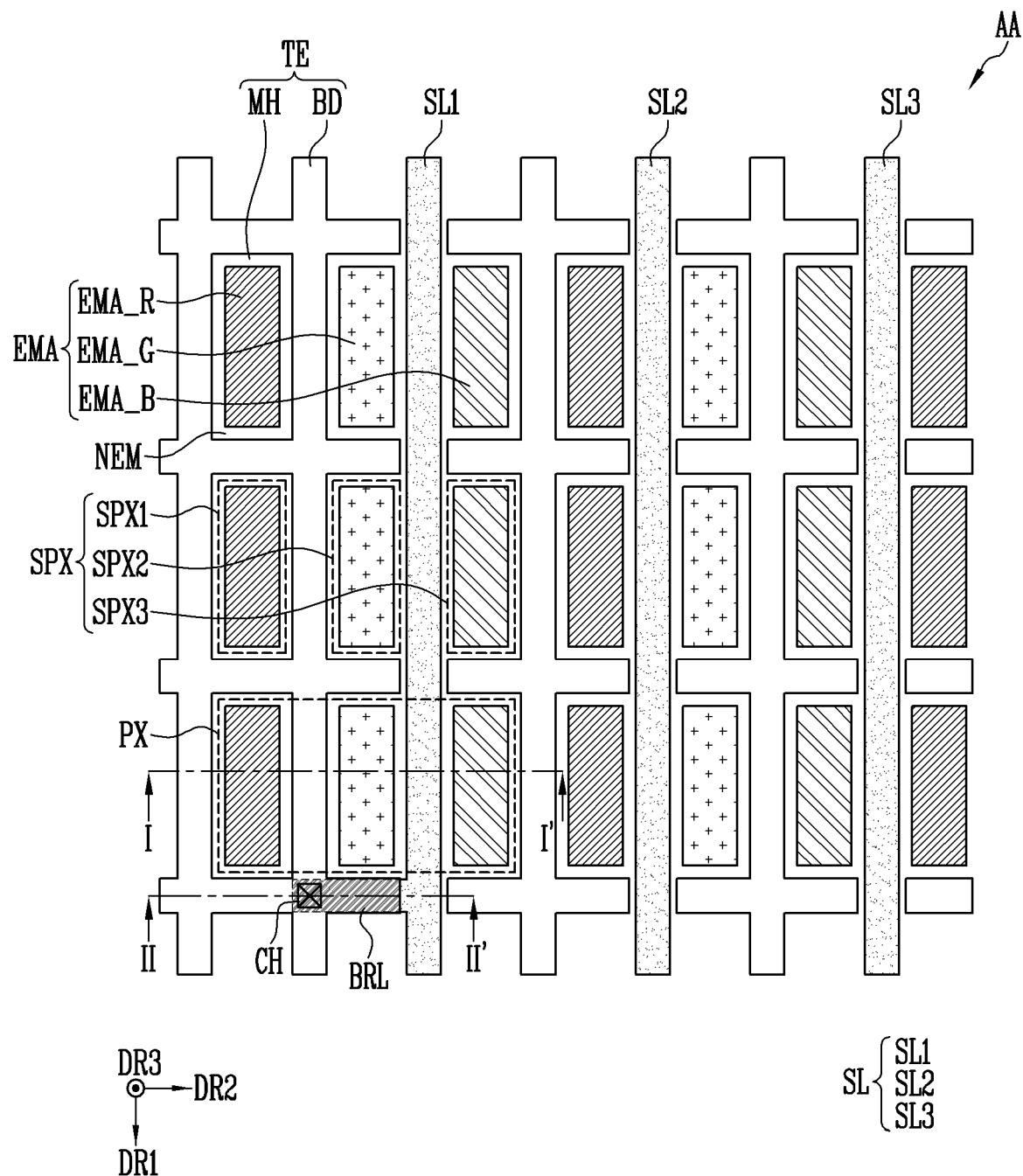
FIG. 9 is an enlarged plan view of an area AA of FIG. 7 according to the first embodiment.
Figure 10:
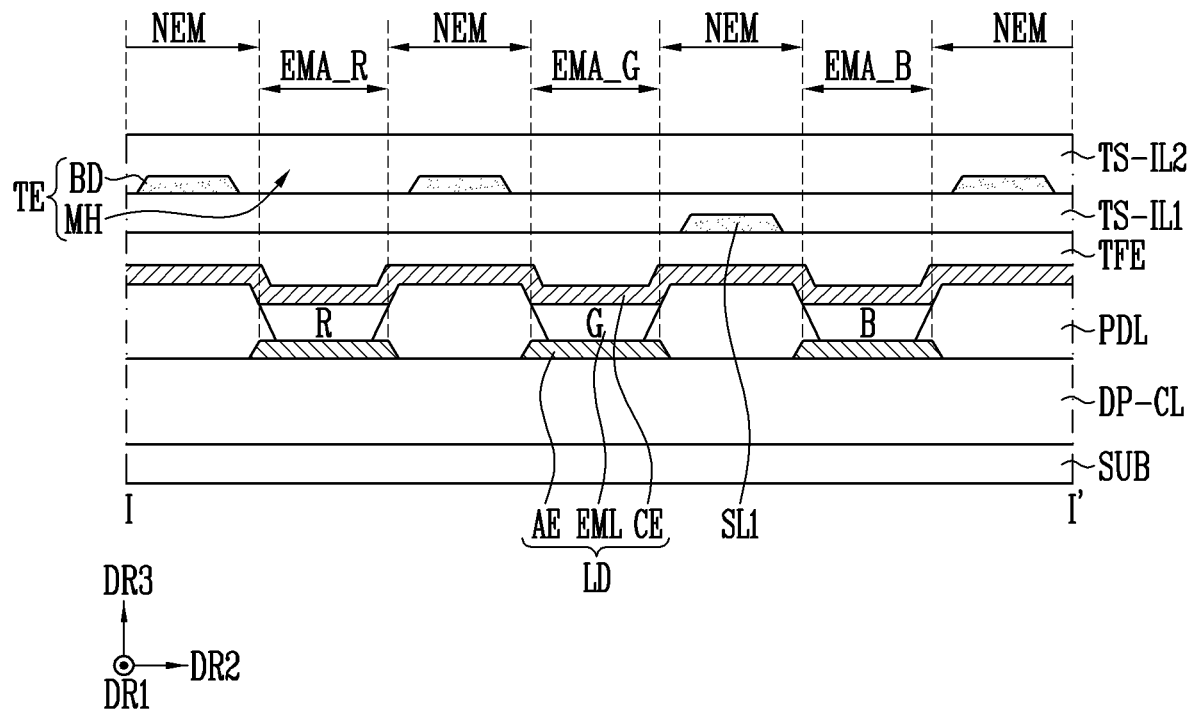
FIG. 10 is a cross-sectional view taken along sectional line I-I' of FIG. 9 according to the first embodiment.
Figure 11:
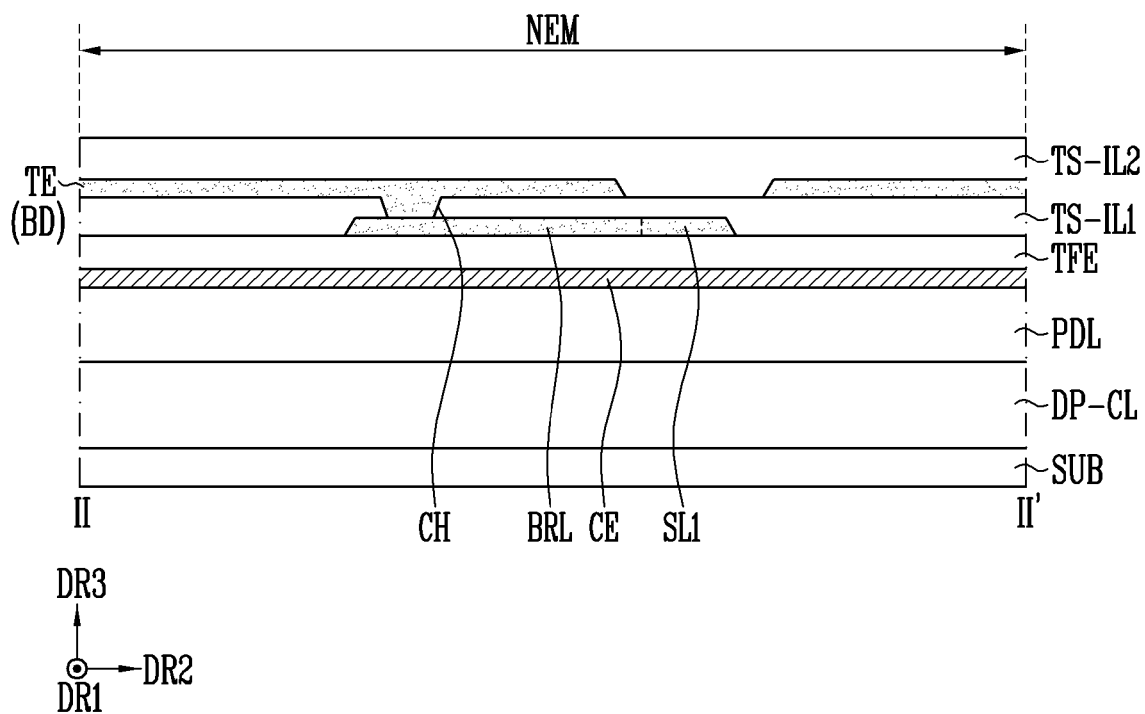
FIG. 11 is a cross-sectional view taken along sectional line of FIG. 9 according to the first embodiment.

FIG. 9 is an enlarged plan view of an area AA of FIG. 7 according to the first embodiment. FIG. 10 is a cross-sectional view taken along sectional line I-I' of FIG. 9 according to the first embodiment. FIG. 11 is a cross-sectional view taken along sectional line II-II' of FIG. 9 according to the first embodiment.

FIG. 9 schematically shows an arrangement relationship between the pixel PX of the display panel DP and the touch sensing unit TS according to the first embodiment.

Referring to FIGS. 3 and 9 to 11, the display panel DP may include the plurality of pixels PX. Each pixel PX may include the emission area EMA and the non-emission area NEM.

The pixel PX may include a first sub-pixel SPX1, a second sub-pixel SPX2, and a third sub-pixel SPX3. Each sub-pixel SPX may be arranged in various ways. In the first embodiment, the first sub-pixel (for example, a red pixel) may be arranged along the first direction DR1 in a first column, the second sub-pixel (for example, a green pixel) may be arranged along the first direction DR1 in a second column adjacent thereto, and the third sub-pixel (for example, a blue pixel) may be arranged along the first direction DR1 in a third column adjacent thereto. For example, the pixels PX may be arranged in a stripe shape. However, this is an example, and the pixels PX may be arranged in other forms, such as a pentile structure.

The size of the emission area EMA in each sub-pixel SPX may be substantially the same. For example, the size of an emission area EMA_R of the first sub-pixel SPX1, the size of an emission area EMA_G of the second sub-pixel SPX2, and the size of an emission area EMA_B of the third sub-pixel SPX3 may be the same. However, the size of the emission area EMA in each sub-pixel SPX may be different for each pixel or some of the pixels according to the arrangement structure of the pixels PX.

As described above, each of the touch electrodes TE may be divided into mesh holes MH and a body BD. A mesh hole MH may overlap the emission area EMA in the thickness direction (e.g., the third direction DR3), and the area of the mesh hole MH may be larger than the area of the emission area EMA. The body BD may overlap the non-emission area NEM in the thickness direction (e.g., the third direction DR3), and the width of the body BD may be smaller than the width of the non-emission area NEM. Due to this structure, light output from the emission area EMA of the display panel DP can effectively pass through the touch electrode TE.

According to the first embodiment, the touch sensing lines SL may be disposed so as not to overlap the touch electrode TE in the thickness direction (e.g., the third direction DR3) in the remaining area except for partial areas. For example, the body BD may not overlap the touch sensing lines SL in the thickness direction (e.g., the third direction DR3) in the remaining area except for the partial areas.

For example, the partial areas may be the contact holes CH, peripheral areas of the contact holes CH, and a portion of an edge area of the touch electrode TE. For instance, the touch sensing lines SL and the touch electrode TE formed in different layers may overlap each other in the thickness direction (e.g., the third direction DR3) in the contact holes CH for electrical connection and the peripheral areas of the contact holes CH. In addition, since the body BD disposed at the outermost side of the touch electrode TE may be formed continuously so that each of the touch electrodes TE can function as a conductor, partial areas of edge areas of the touch sensing lines SL and touch electrode TE may overlap each other in the thickness direction (e.g., the third direction DR3).

In the remaining area, the body BD may be removed from the touch electrode TE, and the touch sensing lines SL may be disposed in areas where the body BD is removed. As described above, the number of touch sensing lines SL included in one electrode column may be the same as the number of touch electrodes TE included in one electrode column. Therefore, as shown in FIG. 7, when the touch electrodes TE are arranged in the 4×8 matrix form, since four touch sensing lines SL are disposed in one electrode column, four areas of the body BD extending in the first direction DR1 may be removed from the touch electrode TE.

For example, the body BD extending in the first direction DR1 between a column of second sub-pixels SPX2 positioned first from the left and a column of third sub-pixels SPX3 positioned first from the left may be removed from the touch electrode TE, and a first touch sensing line SL1 extending in the first direction DR1 may be disposed in the area from which the body BD is removed. The body BD extending in the first direction DR1 between a column of first sub-pixels SPX1 positioned second from the left and a column of second sub-pixels SPX2 positioned second from the left may be removed from the touch electrode, and a second touch sensing line SL2 extending in the first direction DR1 may be disposed in the area from which the body BD is removed. Similarly, the body BD extending in the first direction DR1 between a column of third sub-pixels SPX3 positioned second from the left and a column of first sub-pixels SPX1 positioned third from the left may be removed from the touch electrode, and a third touch sensing line SL3 extending in the first direction DR1 may be disposed in the area from which the body BD is removed.

According to the first embodiment, the touch sensing lines SL may be connected to the touch electrode TE through the connection electrodes BRL. The connection electrodes BRL may be sections branched in the second direction DR2 from the touch sensing lines SL extending in the first direction DR1. For example, the connection electrodes BRL may be simultaneously formed of the same material as the touch sensing lines SL.

As shown in FIG. 11, the connection electrodes BRL may overlap the body BD of the touch electrode TE in the thickness direction (e.g., the third direction DR3) in which the touch sensing line SL1 that is connected to and extends outward from the connection electrode BRL in the second direction DR2 (see, e.g., FIG. 9) does not overlap the body BD in the third direction DR3; however, the first embodiment is not limited thereto. For instance, the connection electrodes BRL may overlap the touch electrode TE in the thickness direction (e.g., the third direction DR3) only in areas connected by the contact holes CH. For instance, the body BD of the touch electrode TE overlapping the connection electrodes BRL in the thickness direction (e.g., the third direction DR3) may be additionally removed, except for the portion associated with the contact holes CH.

The connection electrodes BRL may be electrically connected to the body BD of the touch electrode TE through the contact holes CH. As a result, the touch sensing lines SL may be electrically connected to the body BD of the touch electrode TE through the connection electrodes BRL.

Referring to FIG. 10, the circuit element layer DP-CL may be disposed on the base layer SUB, and the sub-pixels SPX1, SPX2, and SPX3 may be disposed on the circuit element layer DP-CL. The first electrode AE may be disposed in each of the sub-pixels SPX. The pixel defining layer PDL exposing the first electrode AE may be disposed on the first electrode AE. The pixel defining layer PDL may be disposed in the non-emission area NEM.

The light emitting layer EML may be disposed on the first electrode AE exposed by the pixel defining layer PDL, and the second electrode CE may be disposed thereon. The second electrode CE may be disposed on the entire surface without distinguishing between the pixels PX. The first electrode AE, the light emitting layer EML, and the second electrode CE may constitute the light emitting element LD.

The thin film encapsulation layer TFE including an inorganic film and/or an organic film may be disposed on the second electrode CE, and the first conductive layer TS-CL1, the first touch insulating layer TS-IL1, the second conductive layer TS-CL2, and the second touch insulating layer TS-IL2 may be sequentially stacked thereon.

The body BD may be disposed to overlap the pixel defining layer PDL and may be positioned in the non-emission area NEM. For instance, since the body BD does not overlap the emission area EMA, the body BD may not interfere with emitted light.

Looking at the non-emission area NEM between the emission area EMA_G of the second sub-pixel SPX2 and the emission area EMA_B of the third sub-pixel SPX3, since the body BD of the touch electrode TE is removed, the first touch sensing line SL1 and the touch electrode TE may not overlap each other in the thickness direction (e.g., the third direction DR3). As a result, since the formation of the coupling capacitance between the first touch sensing line SL1 and the touch electrode TE is prevented or minimized, an effect of reducing RC load (or RC delay) can be expected.

Hereinafter, additional embodiments will be described. In the following embodiments, description of the same configuration as previously described will be omitted or simplified, and differences will be mainly described.

Figure 12:
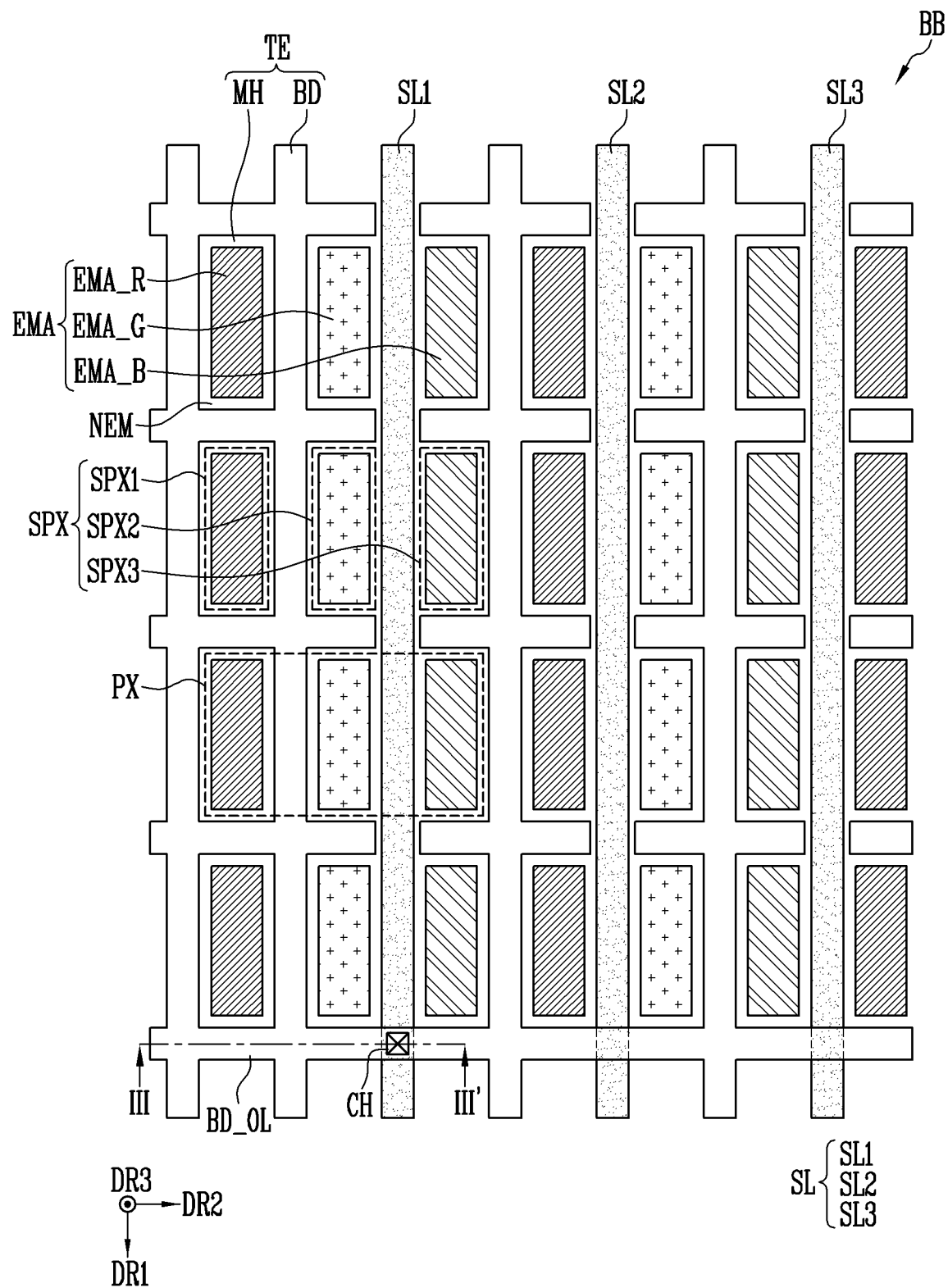
FIG. 12 is an enlarged plan view of an area BB of FIG. 7 according to a second embodiment.
Figure 13:
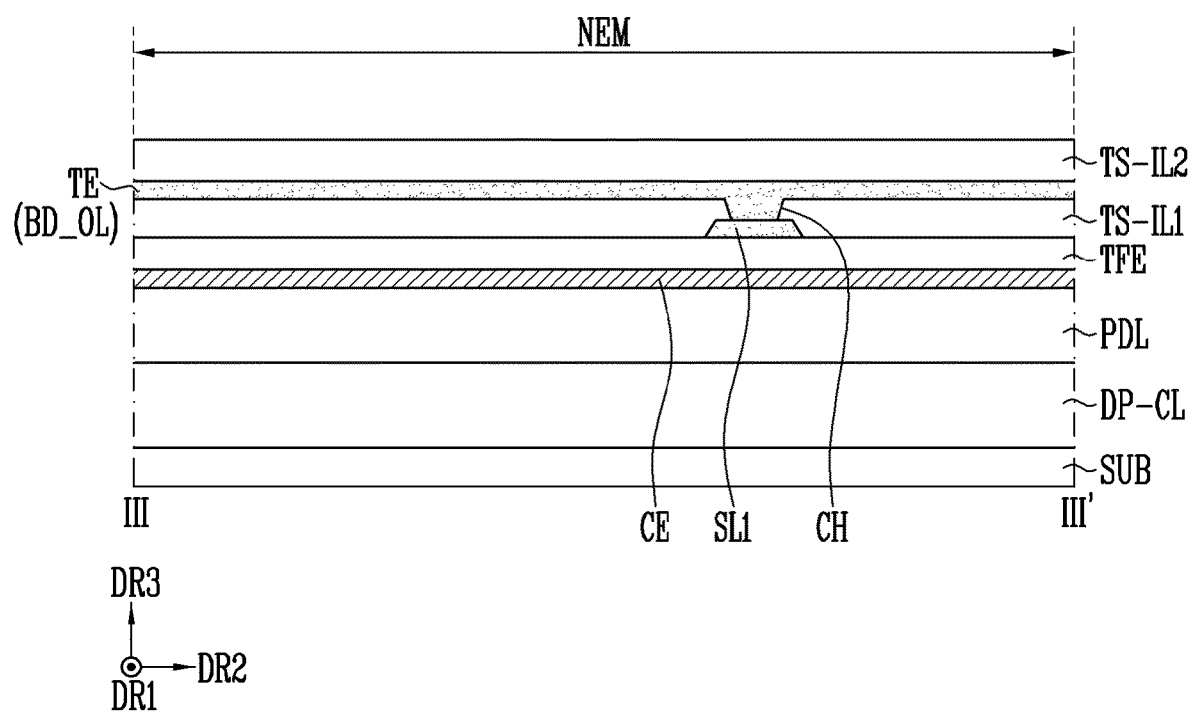
FIG. 13 is a cross-sectional view taken along sectional line of FIG. 12 according to the second embodiment.

FIG. 12 is an enlarged plan view of an area BB of FIG. 7 according to a second embodiment. FIG. 13 is a cross-sectional view taken along sectional line of FIG. 12 according to the second embodiment.

In the first embodiment described in association with FIGS. 9 to 11, the contact holes CH may be formed in the body BD formed inside the touch electrode TE rather than the outermost side. However, in the second embodiment described in association with FIGS. 12 and 13, there is a difference in that contact holes CH may be formed in a body BD_OL (or outer body) formed at the outermost side of the touch electrode TE.

In order for each of the touch electrodes TE to function as a conductor, the body BD_OL formed at the outermost side of the touch electrode TE may be continuously disposed in the second direction DR2. Accordingly, the touch sensing line SL extending in the first direction DR1 may cross the body BD_OL formed at the outermost side of the touch electrode TE.

As shown in FIG. 13, the body BD_OL formed at the outermost side of the touch electrode TE may be directly electrically connected to the first touch sensing line SL1 overlapping in the thickness direction (e.g., the third direction DR3) through a contact hole CH.

Accordingly, the first touch sensing line SL1 may be electrically connected to the touch electrode TE even without the connection electrodes BRL shown in FIG. 9. Accordingly, a section overlapping the touch electrode TE and the touch sensing line SL in the thickness direction (e.g., the third direction DR3) may be further reduced. Therefore, the coupling capacitance between the touch electrode TE and the touch sensing line SL can be further reduced.

Figure 14:
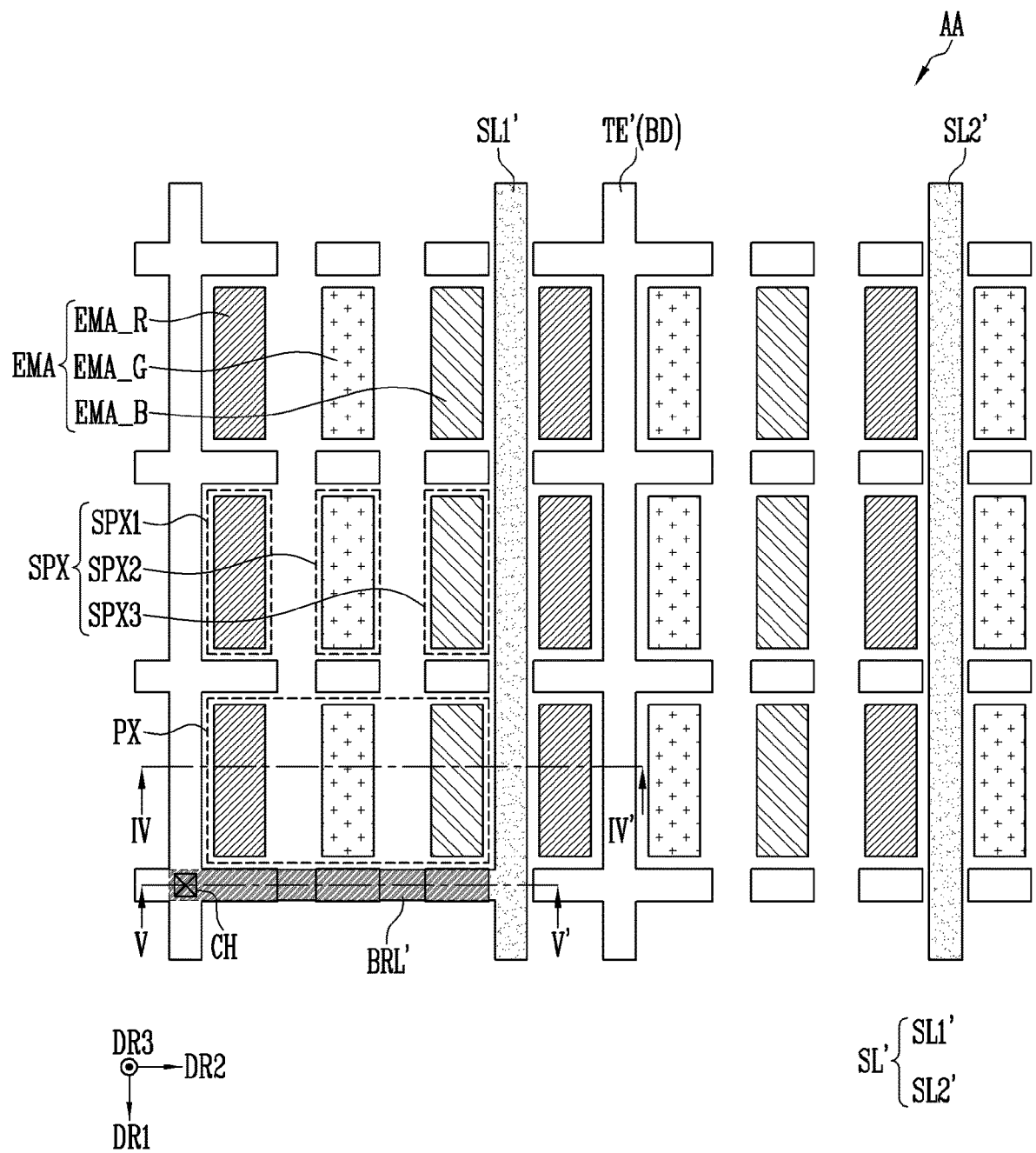
FIG. 14 is an enlarged plan view of an area AA of FIG. 7 according to a third embodiment.
Figure 15:
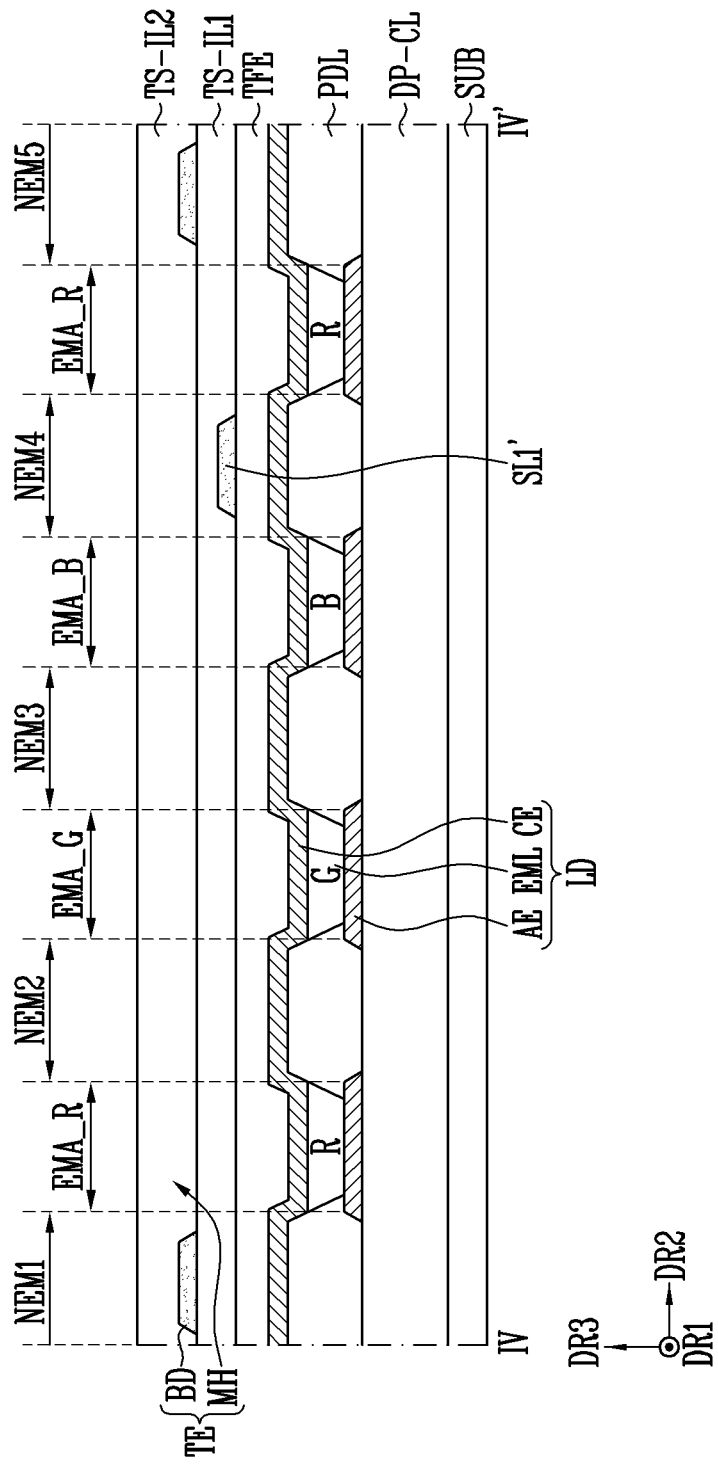
FIG. 15 is a cross-sectional view taken along sectional line IV-IV' of FIG. 14 according to the third embodiment.
Figure 16:
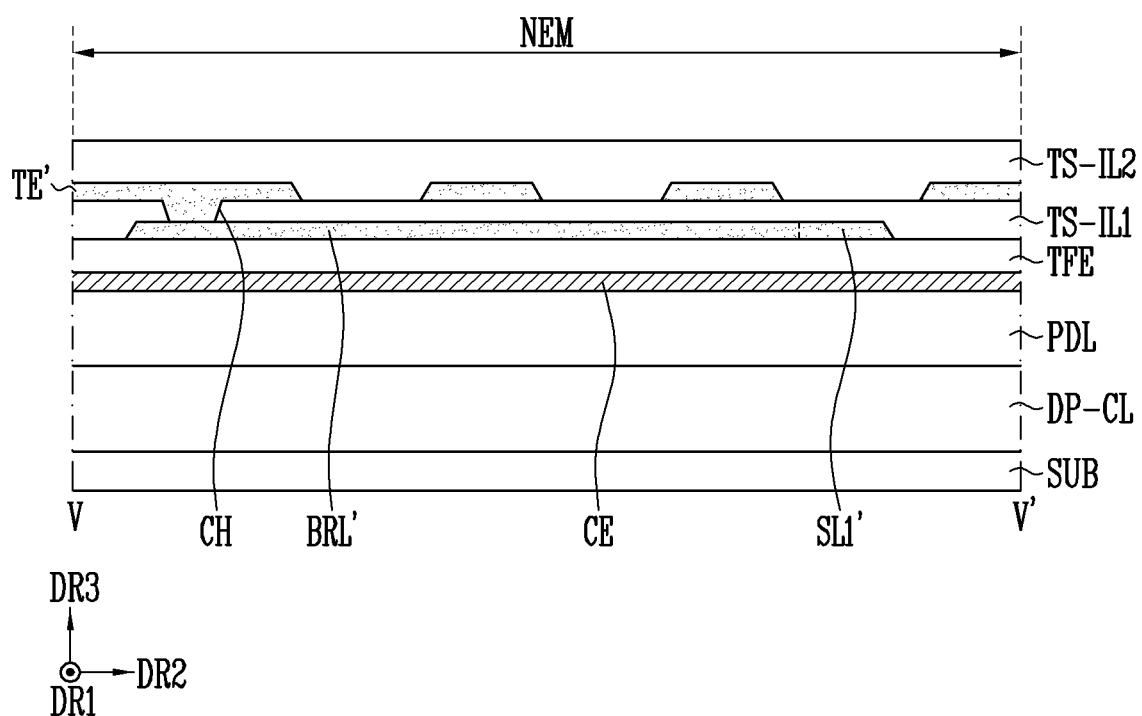
FIG. 16 is a cross-sectional view taken along sectional line V-V of FIG. 14 according to the third embodiment.

FIG. 14 is an enlarged plan view of an area AA of FIG. 7 according to a third embodiment. FIG. 15 is a cross-sectional view taken along sectional line IV-IV' of FIG. 14 according to the third embodiment. FIG. 16 is a cross-sectional view taken along sectional line V-V of FIG. 14 according to the third embodiment.

As a difference from the first embodiment described in association with FIGS. 9 to 11, in the third embodiment described in association with FIGS. 14 to 16, an area from which the body BD of the touch electrode TE is removed may be added, and the area from which the body BD is removed may be left as an empty space such that the distance between touch sensing lines SL' may be widened.

According to the third embodiment, the shape of the area from which the body BD is removed may correspond to the shape of the touch sensing line SL'. Also, the number of areas from which the body BD is removed may be greater than the number of touch sensing lines SL'.

For example, the body BD extending in the first direction DR1 between a column of first sub-pixels SPX1 positioned first from the left and a column of second sub-pixels SPX2 positioned first from the left may be removed from the touch electrode TE', and the body BD extending in the first direction DR1 between a column of second sub-pixels SPX2 positioned first from the left and a column of third sub-pixels SPX3 positioned first from the left may be removed from the touch electrode TE'. However, in these cases, the sensing line SL' may not be disposed in the area from which the body BD is removed. The body BD extending in the first direction DR1 between a column of third sub-pixels SPX3 positioned first from the left and a column of first sub-pixels SPX1 positioned second from the left may be removed, and a first touch sensing line SL1' extending in the first direction DR1 may be disposed in the area from which the body BD is removed.

Similarly, the body BD extending in the first direction DR1 between a column of second sub-pixels SPX2 positioned second from the left and a column of third sub-pixels SPX3 positioned second from the left may be removed from the touch electrode TE', and the body BD extending in the first direction DR1 between a column of third sub-pixels SPX3 positioned second from the left and a column of first sub-pixels SPX1 positioned third from the left may be removed from the touch electrode TE'. However, in these cases, the sensing line SL' may not be disposed in the area from which the body BD is removed. The body BD extending in the first direction DR1 between a column of first sub-pixels SPX1 positioned third from the left and a column of second sub-pixels SPX2 positioned third from the left may be removed, and a second touch sensing line SL2' extending in the first direction DR1 may be disposed in the area from which the body BD is removed.

According to the tenth embodiment, the touch sensing lines SL' may be connected to the touch electrode TE' through connection electrodes BRL'. The connection electrodes BRL' may be sections branched in the second direction DR2 from the touch sensing lines SL' extending in the first direction DR1. For example, the connection electrodes BRL' may be simultaneously formed of the same material as the touch sensing lines SL'.

As shown in FIG. 16, the connection electrodes BRL' may overlap the body BD of the touch electrode TE' in the thickness direction (e.g., the third direction DR3); however, the third embodiment is not limited thereto. For instance, the connection electrodes BRL' may overlap the touch electrode TE' in the thickness direction (e.g., the third direction DR3) only in areas connected by the contact holes CH. For example, the body BD of the touch electrode TE' overlapping the connection electrodes BRL' in the thickness direction (e.g., the third direction DR3) may be additionally removed.

The connection electrodes BRL' may be electrically connected to the body BD of the touch electrode TE' through the contact holes CH. As a result, the touch sensing lines SL' may be electrically connected to the body BD of the touch electrode TE' through the connection electrodes BRL'.

Referring to FIG. 15, only the body BD of the touch electrode TE may be formed in first and fifth non-emission areas NEM1 and NEM5, both the body BD and the touch sensing line SL' may not be formed in second and third non-emission areas NEM2 and NEM3, and only the first touch sensing line SL1' may be formed in a fourth non-emission area NEM4.

Since the body BD of the touch electrode TE' is removed in the fourth non-emission area NEM4, the first touch sensing line SL1' and the touch electrode TE' may not overlap each other in the thickness direction (e.g., the third direction DR3), and since the body BD is additionally removed in the second and third non-emission areas NEM2 and NEM3, the coupling capacitance between the touch electrode TE' and the touch sensing line SL' that may be formed in a diagonal thickness direction may be prevented or minimized. Therefore, an effect of further reducing RC load (or RC delay) can be expected.

In addition, since the distance between the touch sensing lines SL' in the second direction DR2 is widened, an effect of reducing crosstalk between the touch sensing lines SL' can be expected.

In FIG. 14, two areas in which the body BD is removed and the touch sensing line SL' is not disposed are shown based on one touch sensing line SL'. However, this is an example, and the number of the areas may be increased or decreased according to the size of the touch electrode TE'. In addition, the position where the touch sensing line SL' is formed may be variously changed according to design. For example, the first touch sensing line SL1' may also be formed in the third non-emission area NEM3 that is intermediate between the first non-emission area NEM1 and the fifth non-emission area NEM5 in which the body BD is formed.

Figure 17:
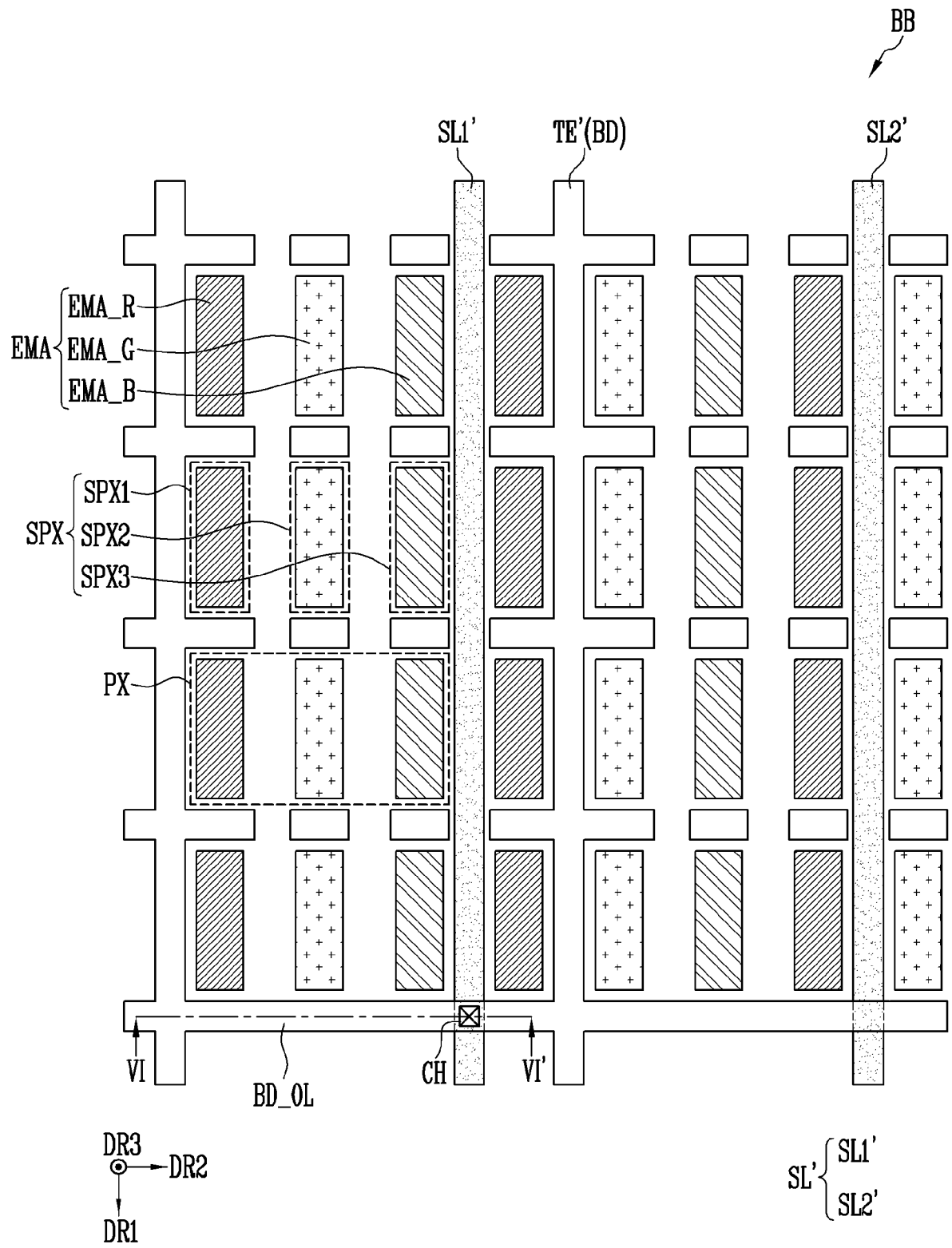
FIG. 17 is an enlarged plan view of an area BB of FIG. 7 according to a fourth embodiment.
Figure 18:
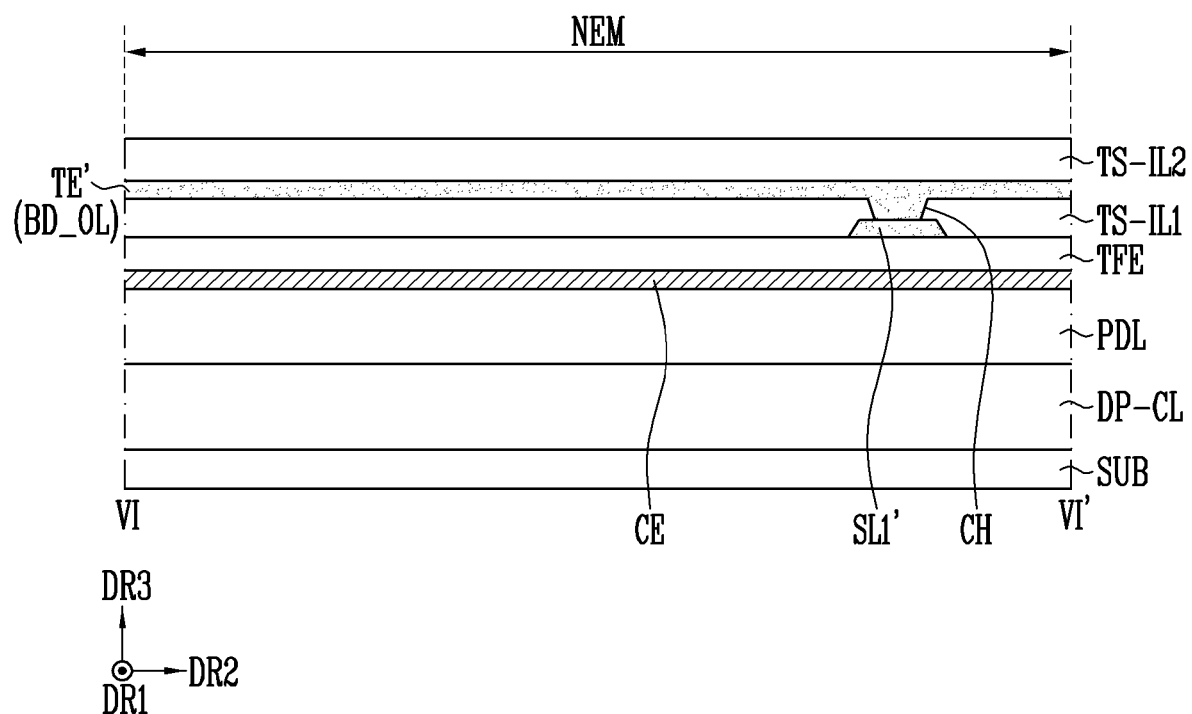
FIG. 18 is a cross-sectional view taken along sectional line VI-VI' of FIG. 17 according to the fourth embodiment.

FIG. 17 is an enlarged plan view of an area BB of FIG. 7 according to an eighth embodiment. FIG. 18 is a cross-sectional view taken along sectional line VI-VI' of FIG. 17 according to the eighth embodiment.

In the third embodiment described in association with FIGS. 14 to 16, the contact holes CH may be formed in the body BD formed inside the touch electrode TE' rather than the outermost side. However, in the fourth embodiment described in association with FIGS. 17 and 18, there is a difference in that the contact holes CH may be formed in the body BD_OL formed at the outermost side of the touch electrode TE'.

In order for each of the touch electrodes TE' to function as a conductor, the body BD_OL formed at the outermost side of the touch electrode TE' may be continuously disposed in the second direction DR2. Accordingly, the touch sensing line SL' extending in the first direction DR1 may cross the body BD_OL formed at the outermost side of the touch electrode TE'.

As shown in FIG. 18, the body BD_OL formed at the outermost side of the touch electrode TE' may be directly electrically connected to the first touch sensing line SL1' overlapping in the thickness direction (e.g., the third direction DR3) through the contact hole CH.

Accordingly, the first touch sensing line SL' may be electrically connected to the touch electrode TE' even without the connection electrodes BRL' shown in FIG. 14. As such, a section overlapping the touch electrode TE' and the touch sensing line SL' in the thickness direction (e.g., the third direction DR3) may be further reduced. Therefore, the coupling capacitance between the touch electrode TE' and the touch sensing line SL' can be further reduced.

According to various embodiments and as described above, a touch electrode and a sensing line may be alternately disposed on a plane so as not to overlap each other in a thickness direction in a remaining area except for partial areas, such that a coupling capacitance between the touch electrode and the sensing line may be minimized or at least reduced. It is noted, however, that the effects according to various embodiments are not limited by the contents described above, and various other effects are included.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A touch sensing unit provided in a display device, the touch sensing unit having a length defined along a first direction, a width defined along a second direction orthogonal to the first direction, and a thickness defined along a third direction orthogonal to the first and second directions, comprising:
- a base substrate;
- touch sensing lines disposed on the base substrate;
- a first touch insulating layer disposed on the touch sensing lines; and
- touch electrodes disposed on the first touch insulating layer, the touch electrodes having a first part that overlaps the touch sensing lines in the third direction in an unfolded state of the display device, and having a second part that does not overlap the touch sensing lines in the third direction in the unfolded state of the display device,
- wherein each of the touch electrodes has a mesh shape comprising: a) a body having openings provided within the body, and b) mesh holes respectively provided within the openings of the body, and
- wherein, with respect to the second part of the touch electrodes, the bodies do not overlap the touch sensing lines in the third direction in a remaining area of the touch sensing unit, the remaining area not including partial areas of the touch sensing unit that correspond to the first part of the touch electrodes,
- wherein the body of each of the touch electrodes comprises an outer body formed in an edge area of each of the touch electrodes, and
- wherein the touch electrodes are respectively electrically connected to the touch sensing lines through contact holes on a one-to-one basis.

2. The touch sensing unit of claim 1, wherein each of the partial areas comprises an area of the outer body, the contact holes, and peripheral areas of the contact holes.

3. The touch sensing unit of claim 1, wherein each of the contact holes is formed in areas overlapping the respective outer body in the third direction.

4. The touch sensing unit of claim 1, wherein each of the contact holes is formed in a respective body disposed adjacent to the touch sensing lines.

5. The touch sensing unit of claim 4, wherein:
- one of the touch sensing lines further comprises a connection electrode; and
- the body disposed adjacent to the one of the touch sensing lines is electrically connected to the one of the touch sensing lines through the connection electrode.

6. The touch sensing unit of claim 1, wherein areas of the touch electrode overlapping the touch sensing lines in the third direction that do not include the partial area are removed during manufacturing of the touch sensing unit.

7. The touch sensing unit of claim 6, wherein shapes of the areas removed from the touch electrodes during manufacturing of the touch sensing unit correspond to shapes of the touch sensing lines.

8. The touch sensing unit of claim 6, wherein a number of the areas removed from the touch electrode during manufacturing of the touch sensing unit are greater than a number of the touch sensing lines.

9. The touch sensing unit of claim 1, wherein first ends of the touch sensing lines are connected to the touch electrodes and second ends are connected to a touch driving circuit.

10. The touch sensing unit of claim 1, further comprising:
- a second touch insulating layer disposed on the touch electrodes.

11. A display device comprising:
- a display panel comprising a display area and a non-display area, the display area comprising sub-pixels; and
- a touch sensing unit disposed on the display panel and having a length defined along a first direction, a width defined along a second direction orthogonal to the first direction, and a thickness defined along a third direction orthogonal to the first and second directions, the touch sensing unit comprising touch electrodes disposed in a sensing area and touch sensing lines connected to the touch electrodes,
- wherein the touch sensing unit comprises:
  - the touch sensing lines disposed on the display panel;
  - a first touch insulating layer disposed on the touch sensing lines; and
  - the touch electrodes disposed on the first touch insulating layer, the touch electrodes having a first part that overlaps the touch sensing lines in the third direction in an unfolded state of the display device, and having a second part that does not overlap the touch sensing lines in the third direction in the unfolded state of the display device,
- wherein each of the touch electrodes has a mesh shape comprising: a) a body having openings provided within the body, and b) mesh holes respectively provided within the openings of the body, and
- wherein, with respect to the second part of the touch electrodes, the bodies do not overlap the touch sensing lines in the third direction in a remaining area of the touch sensing unit, the remaining area not including partial areas of the touch sensing unit that correspond to the first part of the touch electrodes,
- wherein the body of each of the touch electrodes comprises an outer body formed in an edge area of each of the touch electrodes, and
- wherein the touch electrodes are respectively electrically connected to the touch sensing lines through contact holes on a one-to-one basis.

12. The display device of claim 11, wherein each of the partial areas comprises an area of the outer body, the contact holes, and peripheral areas of the contact holes.

13. The display device of claim 11, wherein each of the contact holes is formed in areas overlapping the respective outer body in the third direction.

14. The display device of claim 11, wherein each of the contact holes is formed in a respective body disposed adjacent to the touch sensing lines.

15. The display device of claim 14, wherein:
- one of the touch sensing lines further comprises a connection electrode; and
- the body disposed adjacent to the one of the touch sensing lines is electrically connected to the one of the touch sensing lines through the connection electrode.

16. The display device of claim 11, wherein:
- each of the sub-pixels comprise an emission area and a non-emission area; and
- the bodies and the touch sensing lines disposed to overlap the non-emission area in the third direction.

* * * * *